W. S. LEMMON.
RESONANT CONVERTER.
APPLICATION FILED SEPT. 1, 1916.
1,340,963.
Patented May 25, 1920.
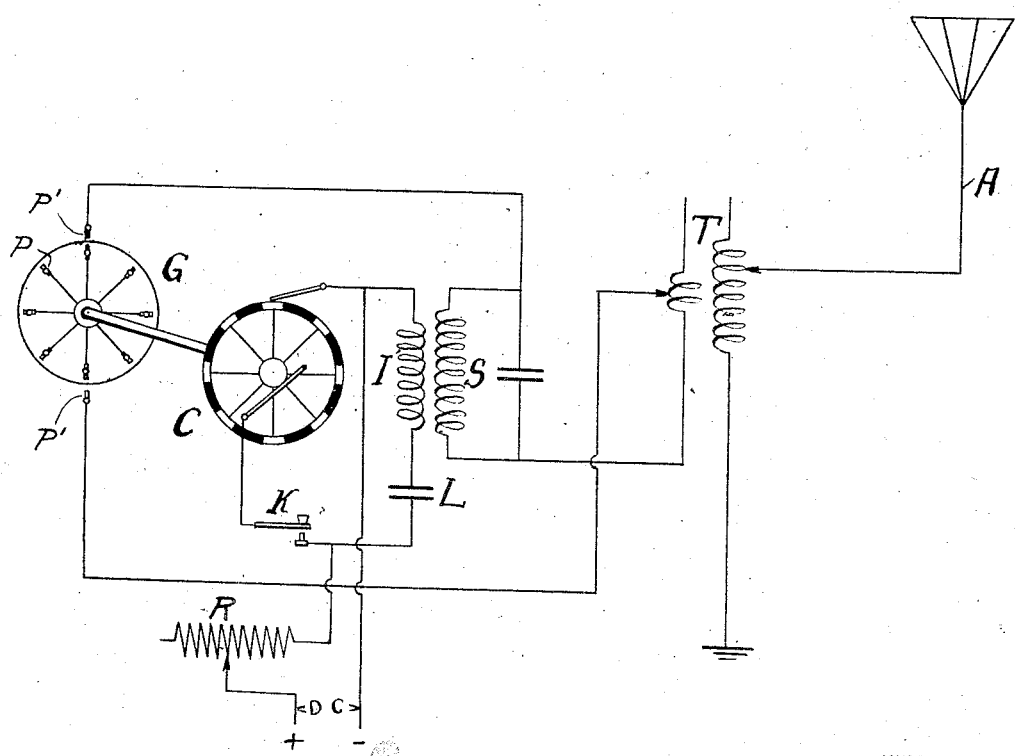
INVENTOR
Walter S. Lemmon
BY
Pennie, Davis, Marvin
ATTORNEYS

UNITED STATES PATENT OFFICE.

WALTER S. LEMMON, OF NEW YORK, N. Y.

RESONANT CONVERTER.

1,340,963.  Specification of Letters Patent.  Patented May 25, 1920.

Application filed September 1, 1916. Serial No. 117,993.

*To all whom it may concern:*

Be it known that I, WALTER S. LEMMON, residing in the city, county, and State of New York, have invented certain new and useful Improvements in Resonant Converters; and I do hereby declare the following to be a full, clear, and exact description of the invention, such as will enable others skilled in the art to which it appertains to make and use the same.

The object of this invention is to provide a simple and inexpensive apparatus for the production of oscillations in radio signaling systems. The arrangement contemplated is particularly adapted to produce oscillations of a remarkably uniform character which, when received by means of the ordinary radio receiving set including a telephone receiver, will produce in the telephone receiver a pure and easily distinguished musical tone.

The nature of the invention will be understood from the accompanying drawing, illustrating an embodiment and from the following description.

In this drawing: The figure represents an arrangement of sending circuits of a radio signaling system, in which a synchronous spark gap and an associated rotary controller are used, the rotary controller serving to make and break a direct current circuit.

In the arrangement of the figure the source of continuous current indicated by the letters DC is connected through an adjustable resistance R (whose function is to limit and control the supplied energy) to an oscillatory circuit containing the rotary circuit controller C, inductance I, which is the primary of a transformer, and the condenser L. It will be observed that the direct current source is so connected to the oscillatory circuit as to apply the direct current energy to two circuits, one of which contains the circuit controller C and the other of which contains the inductance and capacity. In other words, the oscillatory circuit is, in its relation to the direct current source, made up of two parallel paths, one of which containing the inductance and capacity is capable of absorbing energy from the direct current source when the direct current through the rotary controller is interrupted; and the other of which affords a very low resistance path for the direct current when the circuit through the controller is closed, which path also provides a short circuit for the oscillatory circuit.

With the parts thus arranged, a rotation of the controller will periodically interrupt one parallel path causing the direct current to be shunted into the other parallel path containing the inductance and capacity, thereby storing energy in this portion of the circuit. When the controller brush has passed over the insulation segment and comes upon the next conducting segment, the closed circuit is completed and this stored energy will discharge itself through the closed circuit, and if the circuit through the controller remained closed, would, because of the inductance and capacity in the circuit, give rise to damped electrical oscillations. If, however, the speed of rotation and the design of the controller is such, that the circuit is made and broken at intervals which corresponds substantially to the natural frequency of the oscillatory circuit, then the change of circuit connections will be effected substantially without sparking and an alternating current of constant amplitude will flow in the transformer primary I. Consequently, energy in the form of a constant amplitude alternating current may be taken from the circuit through the instrumentality of the transformer secondary S, which may be included in the ordinary spark gap circuit of a radio signaling system.

The closed resonant circuit contains a telegraph key K, and the secondary S is included in the spark gap circuit which is inductively associated through the transformer T with the antenna A. In this case, a synchronous spark gap is used in the spark gap circuit. This apparatus may have any well known form, and should be driven in synchronism with the circuit controller C. By way of example, I have shown a rotating disk G mounted on the same axle with the controller C and carrying radially arranged spark points coöperating with two fixed spark points located at extremities of a diameter of the disk. The rotating disk G may have the same number of spark points as the rotating controller C has pairs of segments and hence where these two devices rotate at the same speed, only alternating half waves of the alternating current are used for sparking. In practice it is, under certain circumstances, desirable that both half waves of the alternating current be utilized, thereby producing two sparks per cycle, and this can obviously be effected in the apparatus by doubling the number of spark points on the disk G or by rotating the disk G at double the speed of the controller C.

Although the primary purpose of the invention is, as above set forth, to produce from a direct current an alternating current of constant amplitude by supplying energy in the form of a direct current to the resonant circuit and permitting the stored energy to oscillate in the said circuit in substantial synchronism with the natural frequency of the circuit, particularly for radio signaling purposes, nevertheless it is possible to supply the energy to the resonant circuit in the form of an alternating current and permit the stored energy to discharge itself as before, and I consider such an arrangement within the broad scope of my invention.

What I claim is:

1. Apparatus for the production of electrical oscillations comprising a source of electrical energy, an oscillatory circuit, means for alternately connecting and disconnecting said circuit to said source, a second oscillatory circuit coupled to said first circuit and a spark gap connected to said second circuit adapted to discharge the energy transferred to the second circuit at time intervals corresponding to the alternate connection and disconnection of the first circuit to the electrical source.

2. Apparatus for the production of electrical oscillations comprising a source of electrical energy, an oscillatory circuit, means for alternately connecting and disconnecting said oscillatory circuit to said source at a frequency corresponding to the natural frequency of said circuit, a second oscillatory circuit coupled to said first circuit and a spark gap connected to said second circuit adapted to discharge the energy induced in said second circuit synchronously with said connecting and disconnecting means.

3. Apparatus for the production of electrical oscillations comprising a source of direct current, as oscillatory circuit, means for periodically charging said circuit from said source at a frequency corresponding to the natural frequency of said circuit, a second oscillatory circuit coupled to said first circuit, and a spark gap connected to said second circuit adapted to discharge the energy transferred to said second circuit synchronously with said periodic charging means.

4. Apparatus for the production of high frequency electrical oscillations comprising a source of direct current, an oscillatory circuit, a rotary multisegment controller adapted to periodically connect said circuit to said source, a second oscillatory circuit coupled to said first circuit, and a rotary spark gap connected to said second circuit adapted to synchronously operate with said controller and to discharge the energy transferred to said second circuit.

5. Apparatus for the production of high frequency electrical oscillations comprising a source of direct current, an oscillatory circuit, a rotary multisegment controller adapted to periodically connect said circuit to said source and to periodically discharge said circuit at a frequency corresponding to the natural frequency of said circuit, a second oscillatory circuit coupled to said first circuit and a rotary spark gap connected to said second circuit adapted to rotate synchronously with said controller and to discharge said second circuit.

In testimony whereof I affix my signature.

WALTER S. LEMMON.